United States Patent [19]
Fritsch et al.

[11] Patent Number: 5,856,900
[45] Date of Patent: Jan. 5, 1999

[54] CAMCORDER ACTUATED TREATMENT DEVICE FOR TREATING A CAMCORDER HEAD

[76] Inventors: Joseph F. Fritsch; Roxanne Y. Fritsch, both of 114 Lansdowne Park, Ballsbridge, Dublin 4, Ireland

[21] Appl. No.: 774,726

[22] Filed: Jan. 3, 1997

[30]     Foreign Application Priority Data

Jan. 4, 1996  [IE]  Ireland ................................. S960003

[51] Int. Cl.⁶ ........................................................ G11B 5/41
[52] U.S. Cl. ........................................................ 360/128
[58] Field of Search ................................... 360/128, 137; 369/71; 15/DIG. 12

[56]              References Cited

U.S. PATENT DOCUMENTS

| 4,631,614 | 12/1986 | Davis et al. ............................. | 360/128 |
| 4,763,216 | 8/1988 | Solhjell et al. ......................... | 360/128 |
| 5,021,911 | 6/1991 | Kingsbury ............................... | 360/128 |

*Primary Examiner*—George J. Letscher
*Attorney, Agent, or Firm*—Sughrue, Mion, Zinn, Macpeak & Seas, PLLC

[57]              ABSTRACT

A cleaning device (1) for cleaning a video head and drum of a camcorder consists of a housing (2) for engaging the cassette receiving area of the camcorder. A brush (5) on a carrier arm (3) is urged from a rest position within the housing (2) into cleaning engagement with the head and drum under the control of a control mechanism (7). The control mechanism (7) is powered by a drive spindle in the cassette receiving area. A retaining latch (10) secured in the housing (2) consists of a camming member (14) for engaging the carrier arm (3) for retaining the carrier arm (3) and the brush (5) in the rest position. A portion (30) of the retaining latch (10) is resilient for urging the retaining latch (10) downwardly for retaining the carrier arm in the rest position. An engagement member (25) on the retaining latch (10) engages a light post (28) in the cassette receiving area as the housing (2) is being lowered into the cassette receiving area for releasing the retaining latch (10).

18 Claims, 2 Drawing Sheets

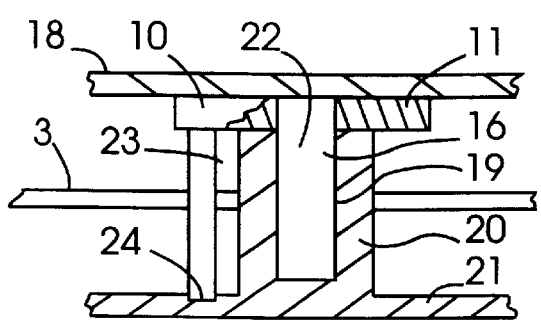
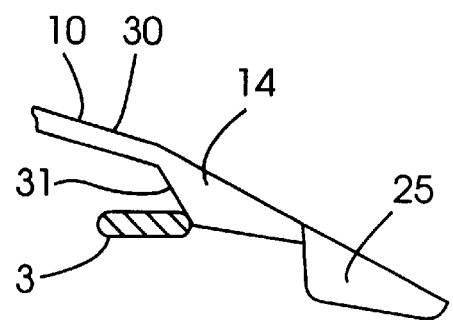
Fig. 5        Fig. 6
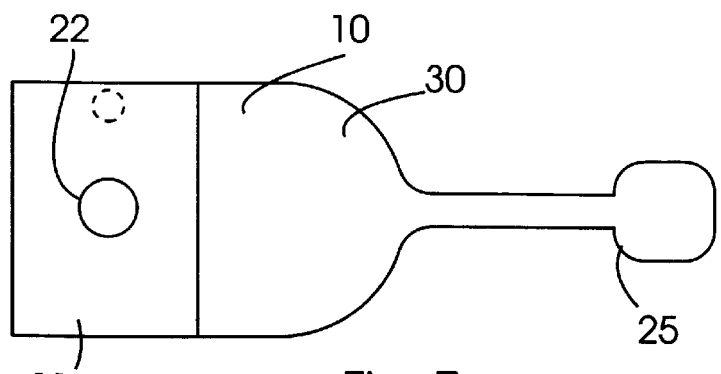
Fig. 7
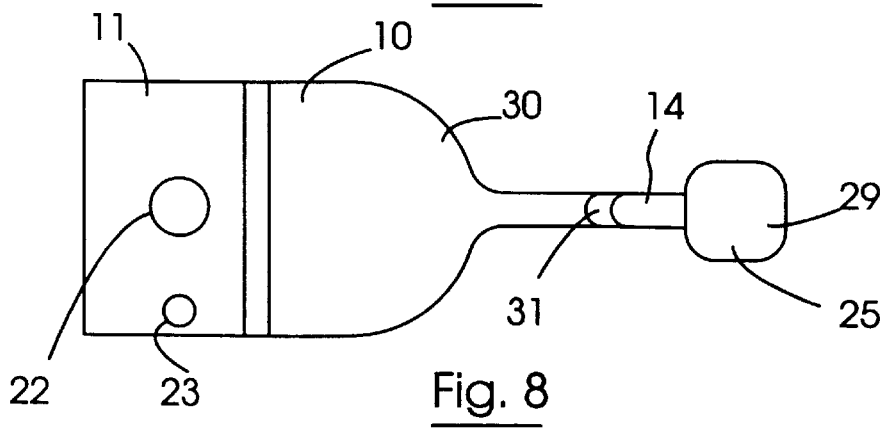
Fig. 8
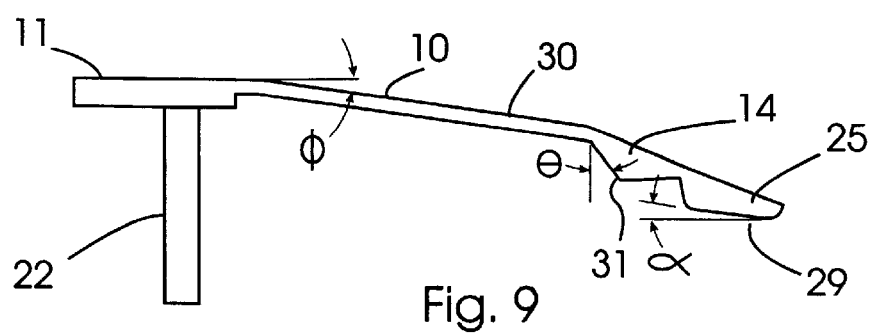
Fig. 9

CAMCORDER ACTUATED TREATMENT DEVICE FOR TREATING A CAMCORDER HEAD

FIELD OF THE INVENTION

The present invention relates to a device for treating a component in a video playback and/or recorder unit or a camcorder unit, or any other playback and/or recorder unit, such as, an audio tape recorder and/or playback unit, of the type which comprises a cassette receiving area for receiving a cassette type housing within which a recording tape is wound between a pair of spools, and a component which is to be treated, for example, cleaned, is adjacent, but spaced apart from the cassette receiving area. In particular, the invention relates to a treatment device of the type which comprises a housing, which is similar to a tape cassette housing, and which is engagable in the cassette receiving area of the unit, and which comprises a carrier arm on which a treating means, such as, a cleaning means for cleaning the component to be treated is located, the carrier arm being moveable from a rest position adjacent the housing to a treatment position with the cleaning means cooperating with the component to be treated.

BACKGROUND TO THE INVENTION

Such treatment devices, typically, are cleaning devices for cleaning, for example, the video head and drum of a video recorder and/or playback unit or a camcorder unit. In such units the video head and video drum are located spaced apart from the cassette receiving area, and a magnetic tape which is wound between a pair of spools in a tape cassette housing is engaged in the cassette receiving area. A plurality of guide rollers are moveable within the unit for withdrawing the magnetic tape from the tape cassette housing for urging the tape into cooperating engagement with the video head and drum for recording onto the tape or playing therefrom. Such video playback and/or recorder units and camcorder units will be well known to those skilled in the art.

Various types of cleaning devices are available for cleaning components, and in particular, the video head and drum of such units. In general, such cleaning devices comprise a housing which is substantially similar to a conventional magnetic tape cassette housing, and either a cleaning tape or a brush or both are located in the housing for cleaning the video head and drum and/or other components of the unit.

In cleaning devices which comprise a cleaning tape, the cleaning tape may be wound between a pair of spools which are similar to those onto which the magnetic tape of a conventional magnetic tape cassette is wound. The cleaning tape is urged from the cassette housing by the guide rollers into cleaning engagement with the video head and drum.

In cleaning devices which comprise a brush, the brush is, in general, mounted on a carrier arm, and the carrier arm is pivotal from a rest position with the carrier arm and the brush located adjacent or within the housing, to a cleaning position with the brush in engagement with the video head and drum for cleaning thereof.

In cleaning devices which comprise a combination of a cleaning tape and a cleaning brush carried on a carrier arm and located in a housing, the carrier arm and cleaning brush are urged into cleaning engagement with the video head and drum as the cleaning tape is being urged into cleaning engagement with the video head and drum by the guide rollers.

Cleaning devices for cleaning the video head and drum, and other components in a video playback and/or recorder unit are disclosed in European Patent Specifications Nos. EP-A-0,439,375 and EP-A-0,210,787. The cleaning device disclosed in EP-A-0,439,375 comprises a cleaning brush which is carried on a carrier arm, both of which are located in a housing of the device when in the rest position. A cleaning tape is not provided in this cleaning device. A drive transmission mechanism is located within the housing, and is cooperable with a spindle in the cassette receiving area of the unit for urging the carrier arm and cleaning brush into a cleaning position with the cleaning brush in cleaning engagement with the video head and drum. The cleaning device disclosed in EP-A-0,210,787 comprises a cleaning tape, and a cleaning brush which is carried on a carrier arm, all of which are located within a housing of the device in the rest position. The cleaning tape cooperates with the carrier arm for urging the carrier arm outwardly of the housing, and in turn the cleaning brush into cleaning engagement with the video head and drum as the cleaning tape is also being urged into cleaning engagement with the video head and drum.

The cleaning devices disclosed in EP-A-0,439,375 and EP-A-0,210,787 function quite adequately. However, there are cleaning devices which comprise a cleaning brush and carrier arm which require the carrier arm to be set in the rest position by the user prior to insertion into the video or other unit, and if the carrier arm is not adequately set by the user in the rest position, and retained therein, when the cleaning device is being loaded into the cassette receiving area, the carrier arm may move just sufficiently out of the rest position towards the cleaning position to become inadvertently engaged with the guide rollers as they are being operated in the mode for withdrawing a tape from a cassette housing. This may cause damage to the carrier arm of the cleaning device, and more importantly may cause damage to one or more of the guide rollers and/or other components and elements of the video unit. Indeed, this problem can arise with cleaning devices in which the carrier arm is automatically set in the rest position, but may become disengaged from the rest position prior to or during insertion into the video or other unit.

There is therefore a need for a cleaning device for a camcorder, and/or a video playback and/or recorder unit which overcomes these problems, and since the problem of inadvertent release of a carrier arm from a housing may arise in other devices for carrying out other treatments of a component in a camcorder and/or a video playback and/or recorder unit, or indeed, in any other playback and/or recorder unit, whether video, audio, data or the like, there is a need for a treatment device for treating a component of such a unit which overcomes these problems.

The present invention is directed towards providing such a treatment device.

SUMMARY OF THE INVENTION

According to the invention there is provided a treatment device for treating a component in a camcorder unit, or a playback and/or recording unit of the type hereinbefore described, the treatment device comprising a housing for engaging in a cassette receiving area of the unit, a treating means for treating the component in the unit, a carrier arm mounted in the housing for carrying the treating means, the carrier arm being moveable between a rest position adjacent the housing, and a treating position whereby the treating means is cooperable with the component to be treated for treating thereof, and a main retaining means mounted in the housing for retaining the carrier arm in the rest position, the main retaining means being operable between a retaining condition for retaining the carrier arm in the rest position, and a release condition whereby the main retaining means is released for permitting movement of the carrier arm to the treating position, the main retaining means being responsive to the housing engaging in the cassette receiving area for operating the main retaining means from the retaining condition to the release condition.

Preferably, the main retaining means is adapted for being responsive to the housing being almost fully located and engaged in the cassette receiving area of the unit for operating the main retaining means into the release condition, for minimising the possibility of the treating means and carrier arm being inadvertently released out of the rest position prior to the housing being almost fully engaged in the cassette receiving area.

Advantageously, the main retaining means is adapted for cooperating with an element in the cassette receiving area, which as the housing is being engaged in the cassette receiving area extends into the housing for operating the main retaining means from the retaining condition into the release condition.

In one embodiment of the invention the main retaining means comprises an engagement means for engaging the element in the cassette receiving area. For convenience, the main engagement means of the main retaining means is adapted for cooperating with a light post which is located in the cassette receiving area of the unit.

In another embodiment of the invention a means for moving the carrier arm into the rest position is located on the main retaining means, the means for moving the carrier arm into the rest position being cooperable with the carrier arm for ensuring that the treating means and the carrier arm are in the rest position prior to the treatment device being ejected from the cassette receiving area.

Preferably, the means for moving the carrier arm into the rest position comprises a camming means located on the main retaining means which is engagable with the carrier arm. Advantageously, the camming means comprises a camming member having a cam profile for engaging the carrier arm and progressively moving the carrier arm into the rest position as the main retaining means is operated into the retaining condition. Ideally, the camming means is adapted for retaining the carrier arm in the rest position, and for gradually releasing the carrier arm from the rest position.

In one embodiment of the invention the main retaining means comprises an elongated retaining latch. Advantageously, an urging means is provided for urging the retaining latch into the retaining condition. Preferably, for convenience, the urging means is inherently formed in the retaining latch. Ideally, the retaining latch comprises a mounting means located at one end thereof for mounting the retaining latch in the housing, and the engagement means is located at the other end of the retaining latch.

Ideally, the urging means comprises a resilient portion of the retaining latch which is located in the retaining latch intermediate the mounting means and the engagement means, and preferably, the camming means is located intermediate the engagement means and the mounting means, and the resilient portion is located between the mounting means and the engagement means, so that the resilient means in cooperation with the camming means progressively moves the carrier arm into the rest position, and gradually releases the carrier arm from the rest position.

Preferably, the engagement means defines an engagement surface, the engagement surface being shaped to substantially eliminate any bending components of a force induced in the element in the cassette receiving area by the cooperation of the main retaining means and the element, for avoiding any damage to the element. The avoidance of damage to an element in the cassette receiving area is of particular importance when the element is of the type which projects upwardly into the cassette receiving element, such as, for example, a light post.

Advantageously, the engagement means cooperates with the element in the cassette receiving area so that the force induced in the element acts substantially axially in the element, so that the element is subjected only to a compressive force.

In another embodiment of the invention a secondary retaining means is provided for retaining the carrier arm in the rest position, the secondary retaining means being responsive to rotation of a drive spindle located in the cassette receiving area of the unit for releasing the secondary retaining means, the main retaining means and the secondary retaining means being independently operable relative to each other. Preferably, a timing means is provided for timing a delay period prior to the secondary retaining means being operated to release the carrier arm, the timing means being responsive to the spindle in the cassette receiving area commencing to rotate.

In one embodiment of the invention the treating means is adapted for treating a video drum of the unit. In another embodiment of the invention the treating means comprises a cleaning means for cleaning the component in the unit.

ADVANTAGES OF THE INVENTION

The advantages of the invention are many. By virtue of the fact that the main retaining means is responsive to the housing engaging in the cassette receiving area for operating the main retaining means from the retaining condition to the release condition, there is little or no danger of the treating means and/or the carrier arm being inadvertently released from the rest position until the treatment device is almost fully engaged in the cassette receiving area. This, thus, minimises the danger of the treating means and the carrier arm being inadvertently engaged by any of the moveable guide rollers within or adjacent the cassette receiving area, thus, avoiding any danger of damage to the carrier arm, treating means and/or the guide rollers or other components in the unit, which invariably would otherwise occur. This advantage is achieved in particular, when the main retaining means is adapted for being responsive to the housing being almost completely located and engaged in the cassette receiving area of the unit for operating the main retaining means into the release condition.

A particular advantage is achieved when the main retaining means is adapted for cooperating with an element in the cassette receiving area, in that the main retaining means may be adapted to engage the element only as the housing of the treatment device is about to fully engage in the cassette receiving area. This advantage in particular, is achieved when the main retaining means is adapted for engaging a light post in the cassette receiving area. The treatment device is particularly advantageous for use in the treatment, and in particular, the cleaning of the video head and drum of a camcorder unit. By providing the main retaining means as an elongated retaining latch, and providing an engagement means for engaging the element in the cassette receiving area, for example, the light post in the cassette receiving area, because of the construction and arrangement of the light post in the cassette receiving area of a camcorder, the retaining latch is moved into the release condition only as the housing of the treatment device is about to become fully engaged in the cassette receiving area. That is, of course provided that the engagement means is located on the retaining latch at a position within the housing to be engaged by the light post as the housing is just about to become fully engaged in the cassette receiving area.

Additionally, in cases where the treatment device is provided with a secondary retaining means, and the secondary retaining means is engagable with a spindle which is located in the cassette receiving area for releasing and urging the carrier arm and then in turn the treating means into engagement with the component to be treated, in the event that the spindle is rotating when the treatment device is being loaded into the cassette receiving area, which would itself release and commence urging the carrier arm into the treating position, the main retaining means retains the carrier arm and in turn the treating means in the rest position until the main retaining means itself, is released, thus, avoiding the danger of damage to the carrier arm, the treating means and/or to any of the components or elements in the unit. Even in cases where the treatment device is not provided with a secondary retaining means, the main retaining means continues to retain the carrier arm and the treating means in the rest position until the housing of the treatment device is engaged in the cassette receiving area, irrespective of any other arrangement which may be provided for urging the carrier arm, and in turn, the treating means into the treating position. Such other arrangements for urging the carrier arm and the treating means into the treating position may comprise any suitable drive means, which may be inboard in the housing, or may rely on movement of one or more of the components in the unit into which the treatment device is loaded.

The invention will be more clearly understood from the following description of a preferred embodiment thereof which is given by way of example only with reference to the accompanying drawings.

BRIEF DESCRIPTION OF THE DRAWINGS

FIG. 5 is a rear sectional elevational view of a detail of the treatment device of FIG. 1 on the line V—V of FIG. 1, FIG. 6 is an end view of another detail of the treatment device of FIG. 1, FIG. 7 is a top plan view of a portion of the treatment device of FIG. 1, FIG. 8 is an underneath plan view of the portion of FIG. 7, and FIG. 9 is a side elevational view of the portion of FIG. 7.

DETAILED DESCRIPTION OF THE INVENTION

Figure 1:
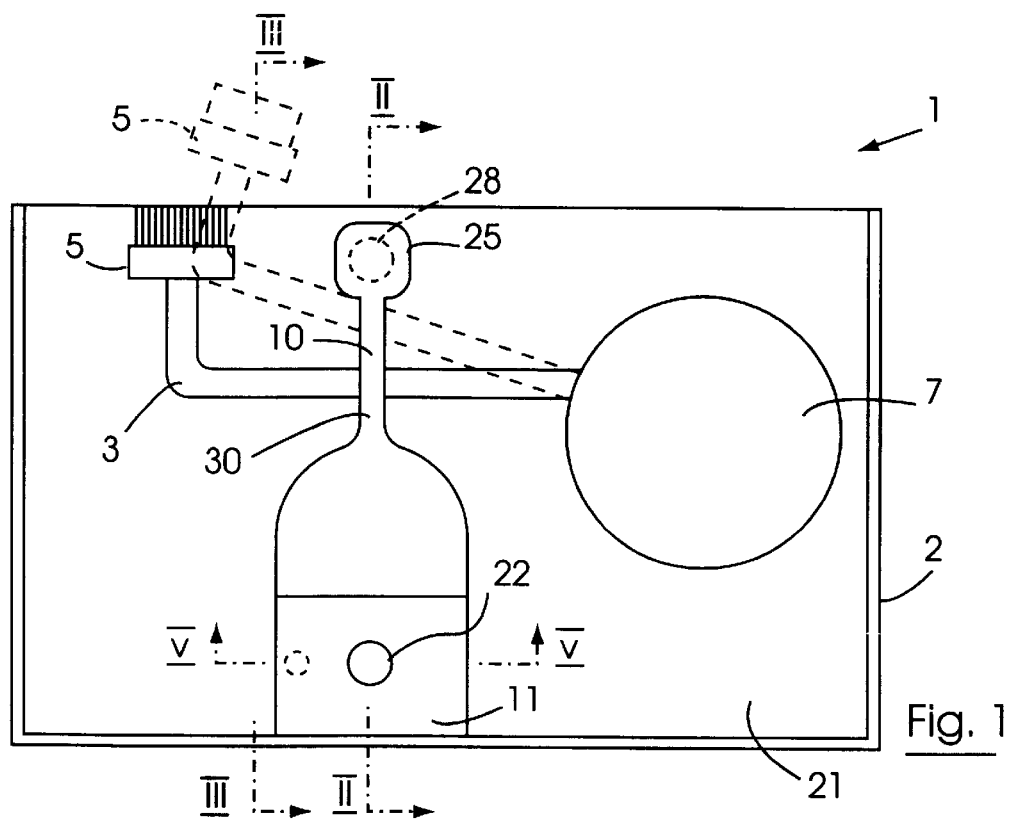
FIG. 1 is a plan view of a treatment device according to the invention for cleaning a video head and drum of a video camcorder unit, a top wall of the treatment device has been removed.

Referring to the drawings there is illustrated a treatment device according to the invention, which in this case is a cleaning device indicated generally by the reference numeral 1 for cleaning a video head and drum of a camcorder unit. Neither the camcorder unit, nor the video head and drum of the unit are illustrated. However, such camcorder units and the location of the video head and drum as well as their operation will be well known to those skilled in the art. Briefly, the camcorder unit comprises a cassette receiving area for receiving a magnetic tape cassette onto which video signals are recorded. The video head and drum are located close to but spaced apart from the cassette receiving area.

The cleaning device 1 comprises a housing 2 of injection moulded plastics material, which is of size and shape substantially identical to a cassette housing of a normal magnetic tape cassette of the type suitable for insertion in the cassette receiving area of the camcorder unit. A carrier arm 3 of injection moulded plastics material is mounted within the housing 2 as will be described below, and carries a treating means, in this case a cleaning means, namely, a cleaning brush 5 for cleaning the video head and drum. The carrier arm 3 extends from a control mechanism 7 which is located within the housing 2, and which is illustrated in block representation in FIG. 1 of the drawings. The control mechanism 7, in use, when the cleaning device 1 is engaged in the cassette receiving area of the camcorder unit engages a spindle located within the cassette receiving area. In normal use, the spindle drives one of the spools in a magnetic tape cassette onto which a magnetic tape of the magnetic tape cassette is wound. On rotation of the spindle the carrier arm 3 is moved under the control of the control mechanism 7 from a rest position illustrated in full lines in FIG. 1 with the carrier arm 3 and the cleaning brush 5 located within the housing 2, to a treating position, in this case, a cleaning position illustrated in broken lines in FIG. 1 with the cleaning brush 5 in cleaning engagement with the video head and drum for cleaning thereof. The operation and construction of such control mechanisms 7 and carrier arms 3 will be well known to those skilled in the art, and is substantially similar to a cleaning device which is supplied under the Trade Mark TRACKMATE by W.E.S.T. of Dublin, Ireland for cleaning the video head and drum of a camcorder unit.

A main retaining means which acts as a safety device for retaining the carrier arm 3 in the rest position comprises an elongated retaining latch 10 of injection moulded plastics material. One end of the retaining latch 10 terminates in a mounting means, namely, a mounting block 11 for mounting the retaining latch 10 in the housing 2. A pin 16 of injection moulded plastics material which extends downwardly from a top wall 18 of the housing 2 engages a bore 22 in the mounting block 11. The pin 16 in turn engages a bore 19 in a post 20 which extends upwardly from a base 21 in the housing 2 for securing the mounting block 11 between the top wall 18 and the post 20. The pin 16 tightly engages the bore 22 in the mounting block 11 so that when the top wall 18 is assembled with the base 12 and the rest of the housing 2, the mounting block 11 is tightly sandwiched between the top of the post 20 and the top wall 18. A locating pin 23 extending downwardly from the mounting block 11 engages a recess 24 in the base 21 for locating and preventing pivotal movement of the retaining latch 10 about the pin 16.

The retaining latch 10 carries a camming means, namely, a camming member 14 for engaging the carrier arm 3 and retaining the carrier arm 3 in the rest position, when the retaining latch 10 is in the retaining condition. The camming member 14 also acts as an urging means as will be described below for urging the carrier arm 3 into the rest position as the carrier arm 3 is approaching the rest position.

Figure 2:
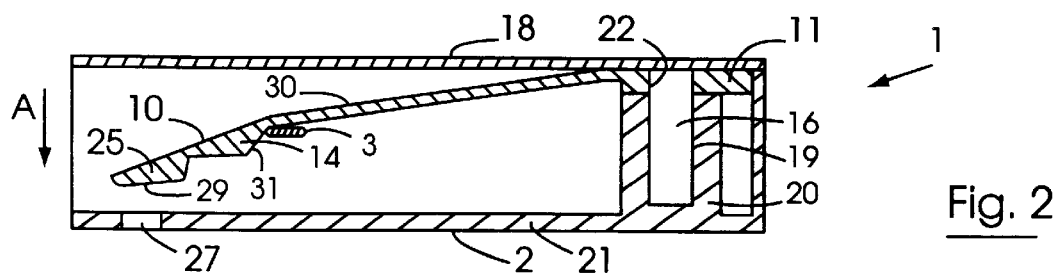
FIG. 2 is a sectional end elevational view of the treatment device of FIG. 1 on the line II—II of FIG. 1.
Figure 3:
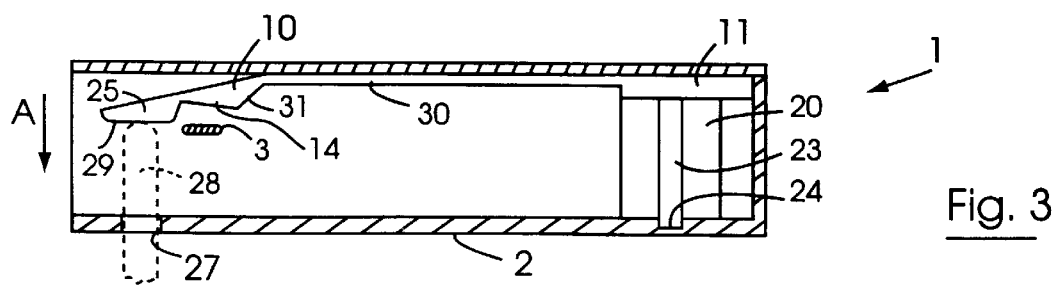
FIG. 3 is a sectional end elevational view similar to FIG. 2 of the treatment device of FIG. 1 illustrated in use on the line III—III of FIG. 1, with a portion of the treatment device in a different position.

The retaining latch 10 terminates in an engagement means which is provided by an engagement member 25 for engaging and cooperating with a light post 28 of the camcorder unit as the housing 2 is being engaged in the cassette receiving area for operating the retaining latch 10. The action of the light post 28 on the engagement member operates the retaining latch 10 between a retaining condition illustrated in FIG. 2 and a release condition which is illustrated in FIG. 3. In the retaining condition the retaining latch 10 retains the carrier arm 3 in the rest position as will be described below, and in the release condition the retaining latch 10 releases the carrier arm 3 for permitting the carrier arm 3 to be moved by the control mechanism 7 into the cleaning position. An opening 27 is provided in the base 21 of the housing 2 for accommodating the light post 28 into the housing 2 as the housing 2 is approaching being fully engaged in the cassette receiving area. Such light posts, are located in the cassette receiving area and will be well known to those skilled in the art.

An urging means for urging the retaining latch 10 into the retaining condition comprises a portion 30 of the retaining latch 10 which extends between the mounting block 11 and the camming member 14. The portion 30 is shaped and sized to be resilient for resiliently urging the retaining latch 10 into the retaining condition, in other words, downwardly within the housing 2 in the direction of the arrow A. In this case, the thickness of the portion 30 of the retaining latch 10 is reduced between the mounting block 11 and the camming member 14.

Turning now to the camming member 14, the camming member 14 is provided with a cam profile face 31 which engages and cooperates with the carrier arm 3 for retaining the carrier arm 3 in the rest position when the retaining latch 10 is in the retaining condition. The cam profile face 31 is shaped and cooperates with the resilient urging action of the resilient portion 30 of the retaining latch 10 to act as a moving means for moving the carrier arm 3 home into the rest position, as the carrier arm 3 is approaching the rest position, in the event that the carrier arm 3 is not fully home in the rest position as the retaining latch 10 is approaching the retaining condition, see FIG. 6. Once the carrier arm 3 is in the rest position, and the retaining latch 10 is in the retaining condition, the cam profile face 31 in cooperation with the urging action in the direction of the arrow A induced by the resilient portion 30 of the retaining latch 10 acts to retain the carrier arm 3 in the rest position.

In order that the effect of the resilient forces of the resilient portion 30 of the retaining latch 10 acting through the camming member 14 on the carrier arm 3 are sufficient for returning the carrier arm 3 to the rest position as the retaining latch 10 is being urged into the retaining condition, the resilient portion 30 of the retaining latch 10 extends from the mounting block 11 downwardly at an angle $\phi$ of approximately 14° to the top wall 18 when the retaining latch 10 is in the retaining condition. Additionally, when the retaining latch 10 is in the retaining condition, the cam profile face 31 makes an angle $\theta$ to a perpendicular from the top wall 18 of approximately 14°. In the release condition, the resilient portion 30 of the retaining latch 10 lies substantially parallel to the top wall 18, see FIG. 3.

Returning now to the engagement member 25, the engagement member 25 defines an engagement surface 29 which engages the top of the light post 28. The engagement surface 29 is angled at an angle $\alpha$ relative to the base 21 of 7.5° approximately when the retaining latch 10 is in the retaining condition. This provides the advantage that when the retaining latch 10 is in the release condition, the engagement surface 29 extends substantially parallel to the base 21, see FIG. 3, so that the force induced in the light post 28 by the action of the engagement member 25 on the light post 28 acts axially downwardly through the light post 28, thereby, avoiding any danger of buckling or bending forces being induced in the light post 28, and thus, avoiding buckling or bending of the light post 28. It is advisable that the force induced in the light post 28 by the engagement member 25 should act axially downwardly in the light post 28, particularly, as the retaining latch 10 is urged into the release condition, since the force induced in the light post 28 is at a maximum when the retaining latch 10 is in the release condition.

Figure 4:
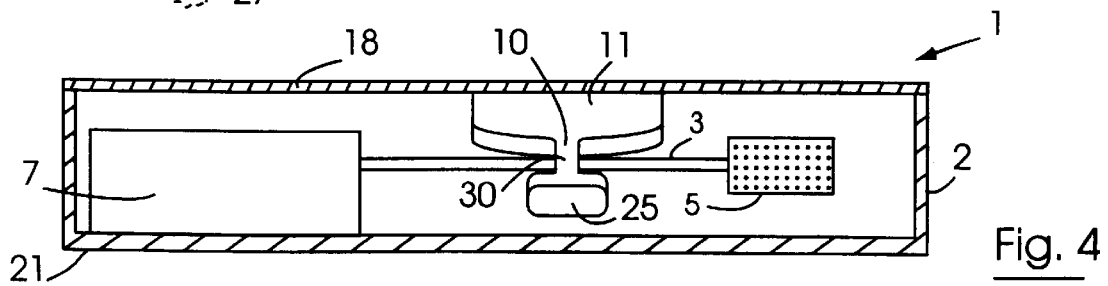
FIG. 4 is a front elevational view of the treatment device of FIG. 1.
Figure 1:
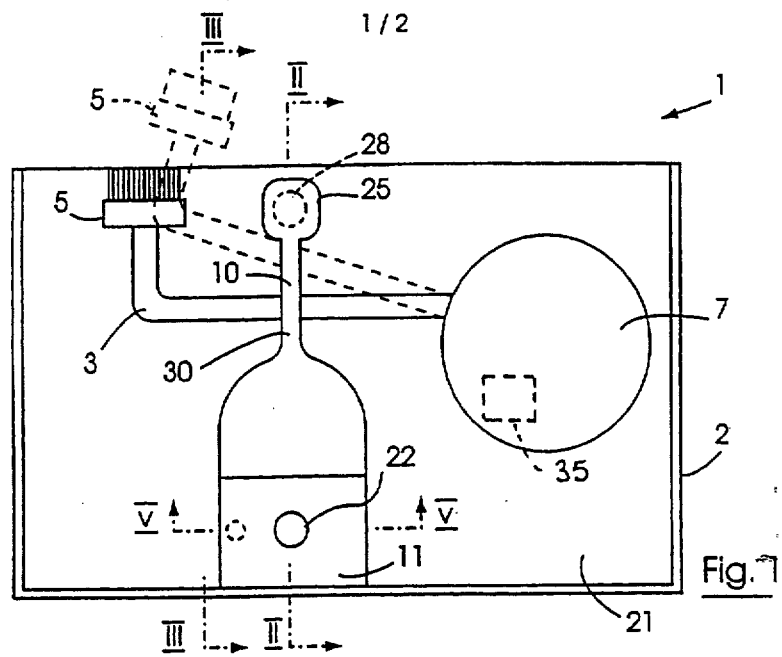
Figure 2:
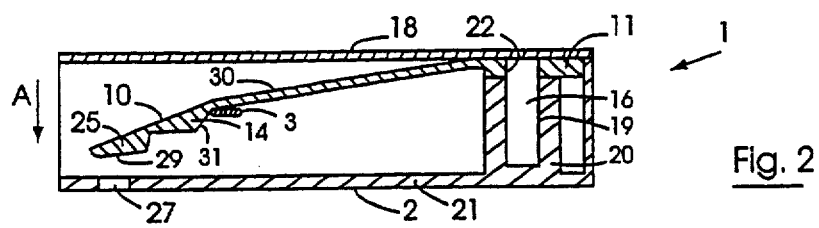
Figure 3:
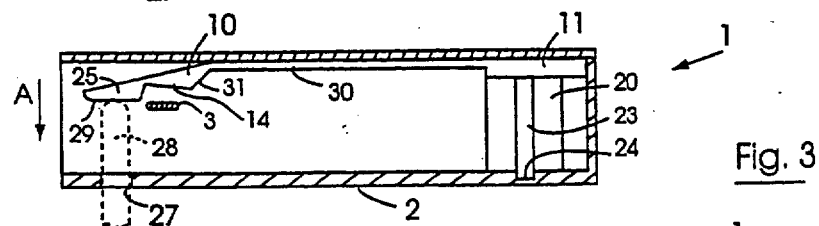
Figure 4:
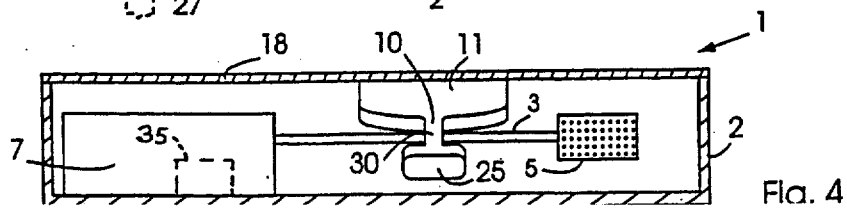

Although not described or illustrated, in detail a secondary retaining means 35 illustrated in block representation in FIGS. 1 and 4 is also provided in the control mechanism 7 for retaining the carrier arm 3 in the rest position. The secondary retaining means 35 is responsive to rotation of the spindle in the cassette receiving area, which is engaged by the control mechanism 7 for releasing the carrier arm 3. A timing means (not shown) may be provided in the control mechanism 7 for delaying release of the carrier arm 3 by the secondary retaining means 35 for a short period of time after commencement of rotation of the spindle. A suitable drive means (not shown) is provided in the control mechanism 7 for transmitting drive from the spindle to the carrier arm 3 for urging the carrier arm 3 into the cleaning position. The carrier arm 3 is retained in the cleaning position by the control mechanism 7 for a cleaning cycle of sufficient length for cleaning the video head and drum. On termination of the cleaning cycle the secondary retaining means 35 urges the carrier arm 3 into the rest position and retains the carrier arm 3 therein.

A cover (not shown) is pivotally mounted to the housing 2 for covering the front face of the housing 2 through which the brush 5 extends. The cover is substantially identical to a conventional cover of a magnetic tape cassette.

In use, the cleaning device 1 is loaded into the cassette receiving area of a camcorder unit in similar fashion as a conventional magnetic tape cassette is loaded into the cassette receiving area. As the cleaning device 1 is being engaged in the cassette receiving area, the light post 28 extends progressively into the housing 2 through the opening 27 in the base 21. As the housing 2 commences to approach its fully engaged position in the cassette receiving area, the light post 28 engages the engagement surface 29 of the engagement member 25 for urging the retaining latch 10 from the retaining condition to the release condition. In other words, as the housing 2 commences to move downwardly in the direction of the arrow B into the cassette receiving area, and downwardly relative to the light post 28, the light post 28 engages the engagement surface 29 of the engagement member 25. The location of the retaining latch 10 in the housing 2 and the positioning of the engagement surface 29 is such that the retaining latch 10 is only urged into the release condition by the light post 28 when the cleaning device 1 is almost fully engaged in the cassette receiving area.

On the retaining latch 10 being moved into the release condition, the carrier arm 3 is free to be moved from the rest position to the cleaning position. However, the carrier arm 3 remains in the rest position until the carrier arm 3 has been released by the secondary retaining means 35 in the control mechanism 7, and the drive means (not shown) in the control mechanism 7 commences to urge the carrier arm 3 from the rest to the cleaning position. On the cleaning cycle having been completed the control mechanism 7 returns the carrier arm 3 from the cleaning position to the rest position.

As the cleaning device 1 is being ejected from the cassette receiving area, the housing 2 is raised upwardly on the light post 28, thereby permitting the retaining latch 10 to move into the retaining condition under the resilient action of the resilient portion 30 of the retaining latch 10. As the retaining latch 10 is being urged from the release condition into the retaining condition, should the carrier arm 3 not be fully returned to the rest position, the carrier arm 3 is engaged by the cam profile face 31 as illustrated in FIG. 6, and further movement of the retaining latch 10 into the retaining condition causes the cam profile face 31 to urge the carrier arm 3 into the rest position. Once in the rest position, and once the retaining latch 10 is in the retaining condition the action of the cam profile face 31 on the carrier arm 3 retains the carrier arm 3 in the rest position.

While the retaining latch has been described as being cooperable with the light post, the retaining latch may be cooperable with any other element in the cassette receiving area which would project into the housing as the cleaning device is being urged into full engagement in the cassette receiving area. It will also be appreciated that a retaining latch of other shape and construction may be provided. It will of course be appreciated that any other suitable retaining means, besides a retaining latch, may be provided, and where the retaining means is to be resiliently urged into the retaining condition, any other suitable resilient urging means may be provided, for example, a spring or the like may be provided instead of relying on the inherent resilience of the retaining means. It will also be appreciated that other urging means may be provided.

It will also be appreciated that while the cleaning device has been described for cleaning a video head and drum of a camcorder unit, the cleaning device may be used for cleaning any other type of video unit, for example, a video player and/or recorder unit, in such case, the construction of the cleaning device, and in particular the housing of the device would be such as to suit the particular unit into which the cleaning device is to be loaded. For example, it is envisaged that the cleaning device may be of the construction described and illustrated in European Specifications Nos. EP-A-0,439,375 or EP-A-0,210,787, and in which case, the main retaining means would act on the carrier arm which carries the cleaning brush. It will of course be appreciated that the cleaning means may be provided by any other suitable cleaning means and may be for cleaning any other component besides a video head and/or drum.

Additionally, it is envisaged that other treating means for treating the component in ways other than cleaning may be used, for example, a demagnetising means may be provided, or a combination of a cleaning means and demagnetising means may be provided. It will also of course be appreciated that the cleaning or treatment device according to the invention may be used for cleaning or treating any other component in any other player and/or recorder unit, for example, an audio tape recorder or the like.

We claim:

1. A treatment device for treating a component in a camcorder unit, or a playback and or recording unit of the type hereinbefore described, the treatment device comprising a housing for engaging in a cassette receiving area of the unit, a treating means for treating the component in the unit, a carrier arm mounted in the housing for carrying the treating means, the carrier arm being moveable between a rest position adjacent the housing, and a treating position whereby the treating means is co-operable with the component to be treated for treating thereof, main retaining means comprising a retaining latch mounted in the housing for retaining the carrier arm in the rest position, the retaining latch being operable between a retaining condition for retaining the carrier arm in the rest position, and a release condition whereby the retaining latch is released for permitting movement of the carrier arm to the treating position, a mounting means on the retaining latch for mounting the retaining latch in the housing, and an engagement means on the retaining latch for engaging an element in the cassette receiving area, the engagement means being responsive to engagement with the element for operating the retaining latch from the retaining condition to the release condition as the housing is being engaged in the cassette receiving area.

2. A treatment device as claimed in claim 1 in which the engagement means is-adapted for engaging the element in the cassette receiving area just as the housing is almost fully located and engaged in the cassette receiving area of the unit for operating the retaining latch into the release condition.

3. A treatment device as claimed in claim 1 in which the main retaining engagement means is adapted for co-operating with the element in the cassette receiving area, which as the housing is being engaged in the cassette receiving area extends into the housing for operating the retaining latch into the release condition.

4. A treatment device as claimed in claim 1 in which the engagement means is adapted for cooperating with a light post which is located in the cassette receiving area of the unit.

5. A treatment device as claimed in claim 1 in which a means for moving the carrier arm into the rest position is located on the retaining latch, the means for moving the carrier arm into the rest position being cooperable with the carrier arm.

6. A treatment device as claimed in claim 5 in which the means for moving the carrier arm into the rest position comprises a camming means located on the retaining latch which is engagable with the carrier arm.

7. A treatment device as claimed in claim 6 in which the camming means comprises a camming member having a cam profile for engaging the carrier arm and progressively moving the carrier arm into the rest position as the retaining latch is operated into the retaining condition.

8. A treatment device as claimed in claim 6 in which the camming means is adapted for retaining the carrier arm in the rest position, and for gradually releasing the carrier arm from the rest position.

9. A treatment device as claimed in claim 1 in which an urging means is provided for urging the retaining latch into the retaining condition.

10. A treatment device as claimed in claim 9 in which the urging means is inherently formed in the retaining latch.

11. A treatment device as claimed in claim 1 in which the retaining latch comprises a mounting means located at one end thereof for mounting the retaining latch in the housing, and the engagement means is located at the other end of the retaining latch.

12. A treatment device as claimed in claim 11 in which the urging means comprises a resilient portion of the retaining latch which is located intermediate the mounting means and the engagement means.

13. A treatment device as claimed in claim 1 in which the engagement means defines an engagement surface, the engagement surface being shaped to substantially eliminate any bending components of a force induced in the element in the cassette receiving area by the cooperation of the retaining latch.

14. A treatment device as claimed in claim 13 in which the engagement means cooperates with the element in the cassette receiving area so that the force induced in the element acts substantially axially in the element.

15. A treatment device as claimed in claim 1 in which a secondary retaining means is provided for retaining the carrier arm in the rest position, the secondary retaining means being responsive to rotation of a drive spindle located in the cassette receiving area of the unit for releasing the secondary retaining means, the retaining latch and the secondary retaining means being independently operable relative to each other.

16. A treatment device as claimed in claim 15 in which a timing means is provided for timing a delay period prior to the secondary retaining means being operated to release the carrier arm, the timing means being responsive to the spindle in the cassette receiving area commencing to rotate.

17. A treatment device as claimed in claim 1 in which the treating means is adapted for treating a video drum of the unit.

18. A treatment device as claimed in claim 1 in which the treating means comprises a cleaning means for cleaning the component in the unit.

* * * * *

UNITED STATES PATENT AND TRADEMARK OFFICE
CERTIFICATE OF CORRECTION

PATENT NO.: 5,856,900
DATED: January 5, 1999
INVENTOR(S): Joseph F. FRITSCH et al.

It is certified that errors appear in the above-identified patent and that said Letters Patent is hereby corrected as shown below:

IN THE CLAIMS:

Claim 1, line 2, change "and or" to -- and/or --;
 line 14, before "main" insert -- a --.

Claim 2, line 2, after "is" delete " - ".

Claim 3, line 2, delete "main retaining".

IN THE DRAWINGS:

Substitute the approved amended sheet of drawings containing Figures 1-4 inclusive for the original sheet of drawings containing Figures 1-4 inclusive.

Signed and Sealed this

Fifteenth Day of May, 2001

Attest:

NICHOLAS P. GODICI

*Attesting Officer*     *Acting Director of the United States Patent and Trademark Office*